(12) United States Patent
Li

(10) Patent No.: US 9,185,188 B1
(45) Date of Patent: Nov. 10, 2015

(54) METHOD AND SYSTEM FOR DETERMINING OPTIMAL TIME PERIOD FOR DATA MOVEMENT FROM SOURCE STORAGE TO TARGET STORAGE

(71) Applicant: EMC Corporation, Hopkinton, MA (US)

(72) Inventor: Junxu Li, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 331 days.

(21) Appl. No.: 13/781,316

(22) Filed: Feb. 28, 2013

(51) Int. Cl.
*G06F 15/16* (2006.01)
*H04L 29/06* (2006.01)

(52) U.S. Cl.
CPC ...................................... *H04L 67/42* (2013.01)

(58) Field of Classification Search
None
See application file for complete search history.

(56) References Cited

U.S. PATENT DOCUMENTS

| 8,924,352 B1* | 12/2014 | Andruss et al. ............... 707/640 |
| 2005/0015641 A1* | 1/2005 | Alur et al. ........................ 714/2 |
| 2007/0067587 A1* | 3/2007 | Rossi ............................. 711/162 |
| 2007/0143827 A1* | 6/2007 | Nicodemus et al. .............. 726/2 |
| 2014/0279922 A1* | 9/2014 | Kottomtharayil ............. 707/654 |

* cited by examiner

*Primary Examiner* — Philip Chea
*Assistant Examiner* — Wuji Chen
(74) *Attorney, Agent, or Firm* — Blakely, Sokoloff, Taylor & Zafman LLP

(57) ABSTRACT

Techniques for determining optimal time window for data movement from a source storage system to a target storage system are described herein. According to one embodiment, statistics data is received representing historic performance statistics over a predetermined period of time by a source storage system, where the historic performance statistics include resource consumption of a plurality of resources including at least one of a processor, memory, input-output (IO) transactions, and network bandwidth. An analysis is performed by an analysis module executed by a processor on the historic performance statistics to determine an optimal time window within the predetermined time period for data movement from the source storage system to a target storage system based on the analysis. A scheduler executed by the processor is to schedule the data movement from the source storage system to the target storage system according to the optimal time window.

18 Claims, 6 Drawing Sheets

METHOD AND SYSTEM FOR DETERMINING OPTIMAL TIME PERIOD FOR DATA MOVEMENT FROM SOURCE STORAGE TO TARGET STORAGE

FIELD OF THE INVENTION

Embodiments of the present invention relate generally to data storage systems. More particularly, embodiments of the invention relate to determining optimal time period for data movement from source storage to target storage.

BACKGROUND

Data movement is a critical feature for disaster recovery appliances. There are numerous configurations where data are transmitted across the network for disaster recovery purposes: pairs of office protecting each other, satellite offices transmitting to headquarters, and satellite offices transmitting to relay stations that consolidate and then transmit to one or more national data centers. Communication may occur over low bandwidth links because customers are located in inhospitable locations such as offshore or in forests. The goal for disaster recovery purposes is to minimize resource contention during data movement so it can be accelerated without impacting other tasks.

The challenge is to transfer all of the logical data (e.g., all files within the retention period) while reducing the transmission as much as possible. Storage appliances achieve high compression by transferring metadata that can reconstruct all of the files based on strong fingerprints of segments followed by the unique data segments.

Typically various data movement operations (such as backup, replication) are scheduled manually and statically based on human empirical knowledge. With increasing virtualization with globalized deployment and 24×7 service level requirements across different service time zones, the scheduling task may not be as obvious as before, with thousands of virtual machines (VMs) with shared compute and storage resources being managed for backup at data center, it may become a daunting task to properly schedule central processing unit (CPU) and input/output (I/O) intensive operations, such as backup and replication, so underlying infrastructure resource would not be overwhelmed. The current approach does not adequately take into account overall resource consumption across a period of time with changing nature for possible adaptation in scheduling resource intensive operations.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
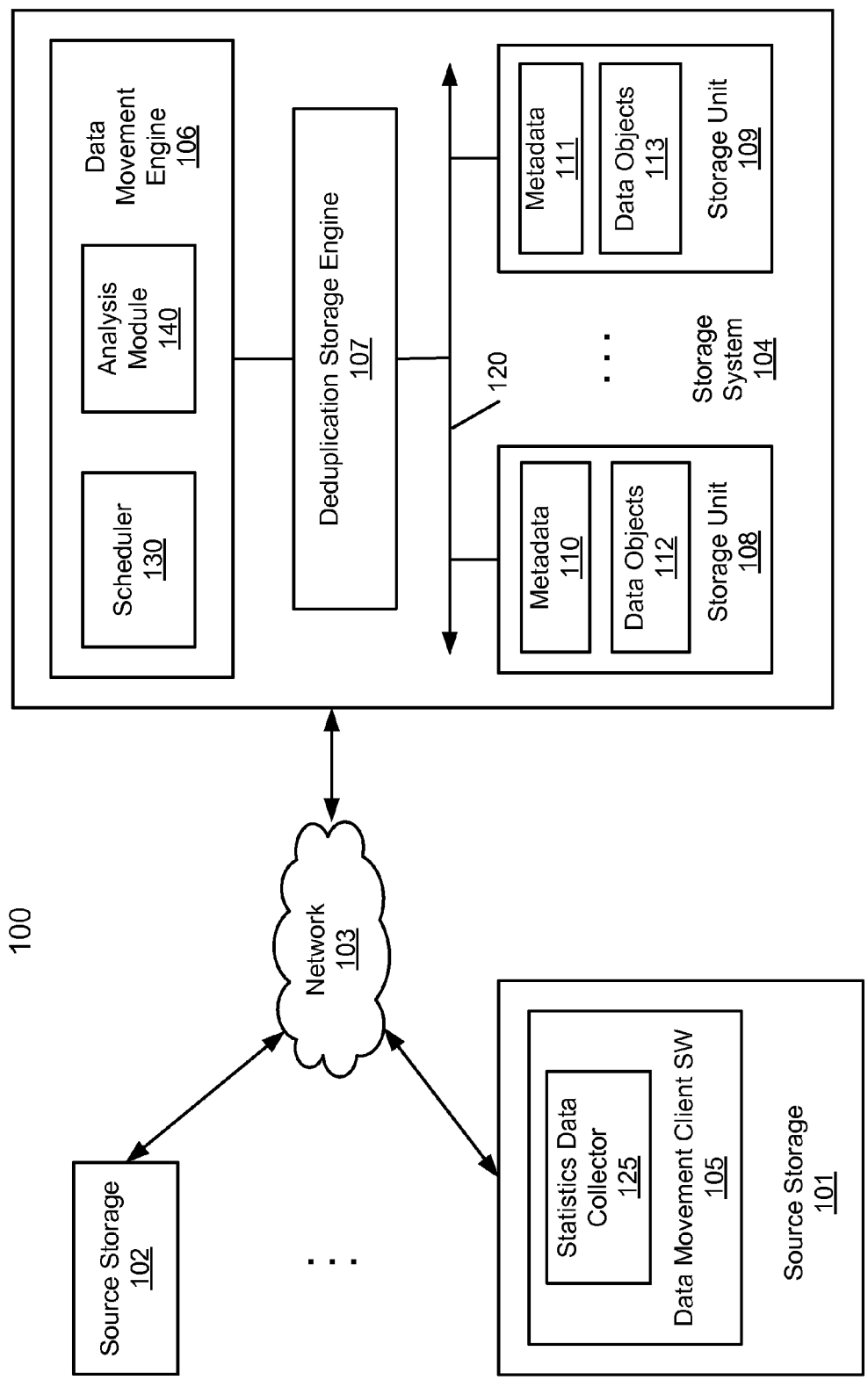
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for determining optimal time period for data movement are described herein. Embodiments of the invention are to proactively collect historical performance statistics from various resources as well as applications, so quantitative information can be obtained to support automatic scheduling of resource intensive operations, and resource ranking with weight factors can be performed to find optimal operation time windows. In addition, the resource consumption data collection and analysis will be continuous, as resource utilization changes, it is captured automatically to adapt operation time window determination. Typical resources are CPU, disk I/O bandwidth, memory, and network bandwidth. Additional resources can be defined based on application backup and data movement needs. It's important to exclude the portion of resource consumption by backup and data movement operations.

According to one embodiment, a data collector is to periodically collect performance statistics at a source storage device or appliance. The performance statistics may include resource consumption over a period of time. The performance statistics can then be analyzed by an analysis module, running within the source storage, a target storage, and/or a dedicated manager system, to determine an optimal time window (e.g., time of a day, a week, a month, etc.) for data movement (e.g., data replication or backup, data migration) from the source storage to the target storage, such that the operations of the source and/or target storage devices would not be disrupted due to resource availability and/or network traffic congestion.

In one embodiment, each resource at a given point in time is assigned with a weight factor, where the weight factor represents an importance of the resource at that particular given point in time. The weight factors for different resources may be the same or different. The weight factors for the same resource at different points in time may be the same or different. A resource at a given point in time is ranked, using a ranking algorithm (e.g., linear or non-linear ranking algorithm) based on the resource consumption of the resource in view of the associated weight factor. Within a predetermined period of time during which the statistics were collected, several time window candidates for data movement are defined. For each time window candidate, a standard mean value and standard variance of selected or sample points in time within the corresponding time window candidate are calculated based on the ranking of each resource within that particular time window candidate. One or more of the time window candidates are then selected as an optimal time window for data movement based on the calculation, such that the standard mean value and standard variance are within a predetermined range or ranges.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof. Clients 101-102 may represent a source storage system having a replication or backup client software such as replication client 105 to replicate data from the source storage system to a target storage system such as storage system 104.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, replication or data movement engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. Storage system 104 may be target storage system to received data replicated or backed up from a client storage system such as storage systems 101-102.

In response to a data file to be stored (e.g., backed up or replicated) in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains. Data movement engine 106 and deduplication storage engine 107 may be implemented as an integrated unit or component.

In one embodiment, source storage system 101 includes data movement client software 105 responsible at the source side for perform data movement (e.g., data replication and/or migration) from source storage system 101 to storage system 104 as a target storage system. Although not shown, source storage system 102 has a similar architecture as source storage system 101. Data movement client software 105 further includes or is associated with statistics data collector 125 to periodically collect performance statistics of source storage system 101. The performance statistics may include resource consumption of selected resources of source storage system 101. The selected resources may include CPU, disk IO bandwidth, memory, and network bandwidth, etc. Additional resources can be defined based on application backup and data movement needs. However, the resources being tracked may exclude those consumed by the data movement operations. The resource consumptions may be tracked for different points in time during a predetermined period of time or tracking period (e.g., time of a day, a week, or a month, etc.).

Figure 2:
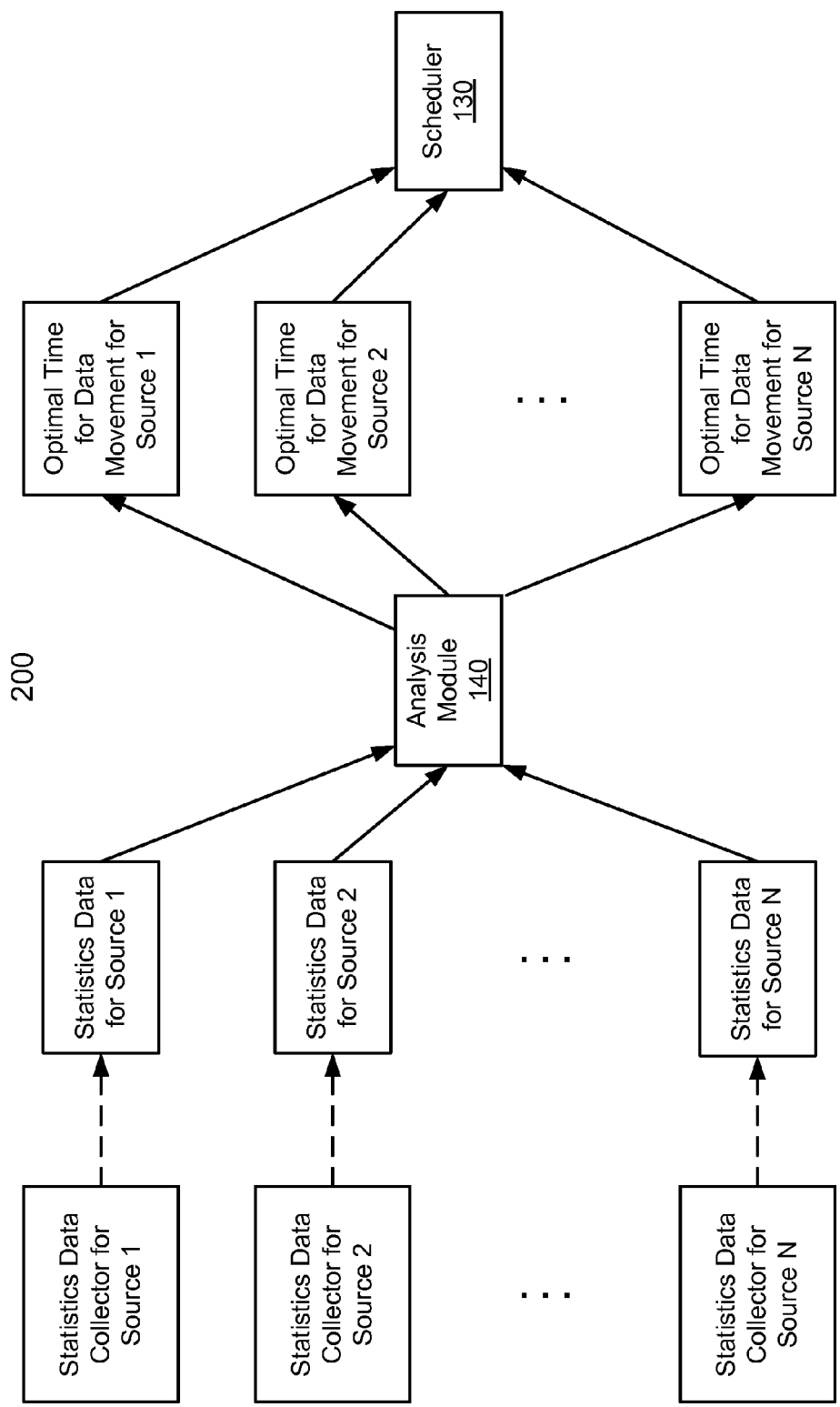
FIG. 2 is a block diagram illustrating a process for scheduling data movements according one embodiment of the invention.

Data collector 125 is configured to transmit the collected performance statistics to storage system 104 to be analyzed by analysis module 140. Note that analysis module 140 may be located in another system such as a dedicated analysis system in the cloud, or alternatively in source storage system 101. Analysis module 140 is to perform an analysis on the performance statistics received from source system 101 to determine an optimal time window for data movement from source storage system 101 to target storage system 104. Analysis module 140 may also receive performance statistics from other source storage systems such as source storage system 102, such that the time window for data movement for all source storage systems to a common target storage system may be determined in view of resources consumption of the source storage systems and the target storage system, as shown in FIG. 2. Scheduler 130 can then schedule data movement for sources 101-102 according to their respective optimal time windows. As a result, the operations of the source and/or target storage systems would not be significantly affected due to resource availability and/or network traffic congestion.

Figure 3:
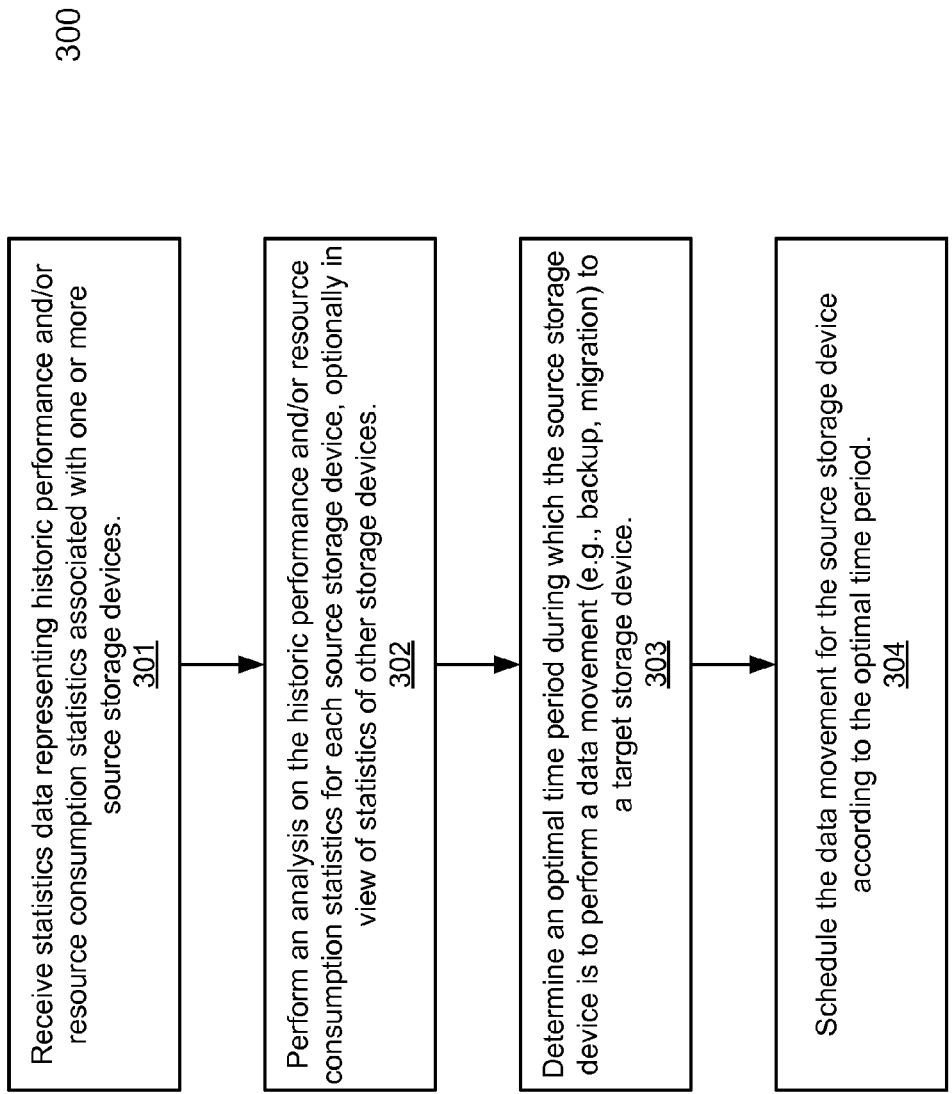
FIG. 3 is a flow diagram illustrating a method for scheduling data movement from a source storage system to a target storage system according to one embodiment of the invention.

FIG. 3 is a flow diagram illustrating a method for scheduling data movement from a source storage system to a target storage system according to one embodiment of the invention. Method 300 may be performed by system 100 of FIG. 1, such as storage system 104, which may be performed by processing logic in software, hardware, or a combination thereof. Referring to FIG. 3, at block 301, processing logic receives performance statistics of one or more source storage systems, where the performance statistics include resource consumption over a period of time. At block 302, processing logic performs an analysis on the historic performance and/or resource consumption statistics for each source storage device, optionally in view of statistics of other storage devices. At block 303, processing logic determines an optimal time period during which a data movement (e.g., backup, migration) is performed from the source storage device to a target storage device. At block 304, the data movement is scheduled according to the optimal time window.

Figure 4:
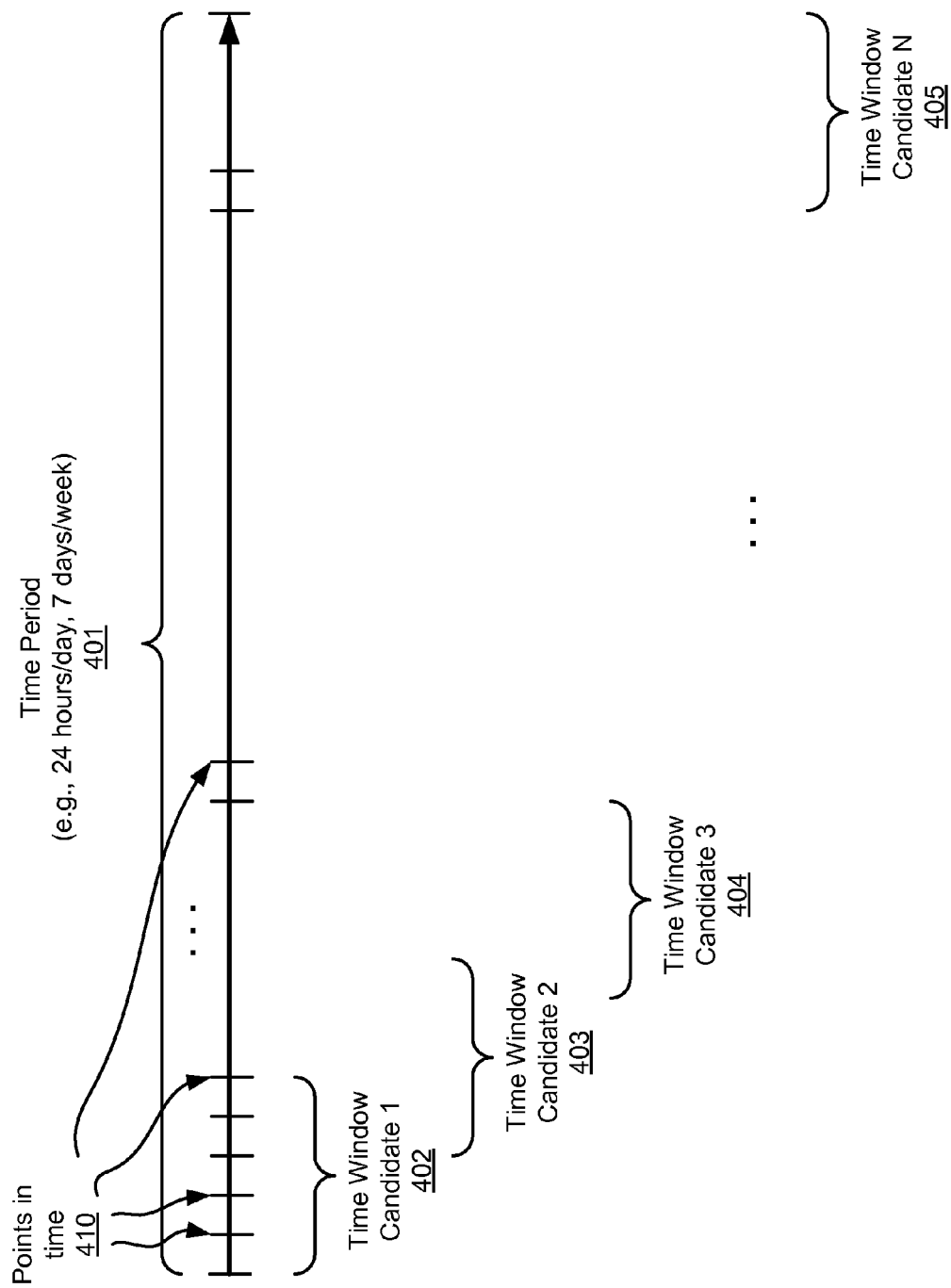
FIG. 4 is a block diagram illustrating a process for determining an optimal time window for data movement according to one embodiment of the invention.

Referring now to FIG. 4, in one embodiment, in order to determine an optimal time window for data movement, each resource at a given point in time (e.g., points in time 410) is assigned with a weight factor, where the weight factor represents an importance of the resource at that particular given point in time. For example, resource usages may be higher during the day time than the night time of a day. Similarly, resource consumptions may be higher during weekdays than weekends. The weight factors for different resources may be the same or different. The weight factors for the same resource at different points in time may be the same or different. A resource at a given point in time is ranked, using a ranking algorithm (e.g., linear or non-linear ranking algorithm) based on the resource consumption of the resource in view of the associated weight factor. Within a predetermined period of time 401 during which the statistics were collected, several time window candidates 402-405 for data movement are defined. For each of the time window candidates 402-405, a standard mean value and standard variance of selected or sample points in time within the corresponding time window candidate are calculated based on the ranking of each resource within that particular time window candidate. One or more of the time window candidates are then selected as an optimal time window for data movement based on the calculation, such that the standard mean value and standard variance are within a predetermined range or ranges.

According to one embodiment, a weight $w_i$ between [0, 1] is assigned to each resource identified by an integer i, and based on relative consumption level of each resource and available capacity, the relative importance of each resource can vary at different time. For the sake of simplicity, the weight for N resources at time t is initialized to:

$$w_i(t)=1/N \text{ for } i=1 \ldots N$$

with constraint of:

$$\Sigma w_i(t)=1 \text{ for } i=1 \ldots N$$

$w_i(t)$ can be dynamically adjusted based on relative importance among available resources.

Each resource is ranked, where rank r is a value in the range [0, 1] indicating a level in meeting specified criteria, with 0 indicating least likely and 1 most likely in meeting the criteria (e.g., CPU, memory, network bandwidth, or disk IO centric criteria). A resource can be ranked using a linear ranking algorithm or a non-linear ranking algorithm dependent upon the characteristics of the performance statistics. When performance characteristics of a resource are linearly correlated to the resource consumption level, then the linear ranking algorithm should be utilized. When performance characteristics of a resource are nonlinearly correlated to the resource consumption level, then nonlinear ranking algorithm should be utilized.

In a linear ranking algorithm, according to one embodiment, for each resource i, it is assumeed there is a maximum value $M_i$, a minimum value $N_i$, and at time t, the reading for resource i consumption is $v_i(t)$. The rank for resource i at time t is expressed as:

$$r_i(t)=w_i(t)*(M_i-v_i(t))/(M_i-N_i)$$

The rank for all resource at time t is expressed as:

$$r(t)=\Sigma r_i(t)$$

where the value of r(t) should be in the range of [0, 1] representing probability of good match, with 0 indicating worst match, and 1 indicating best match.

For nonlinear ranking, different values of $v_i(t)$ will have nonlinear effect on rank evaluation. A Gaussian function f(v) is used to evaluate contributing factor of a resource value. f(v) is defined as follows:

$$f(v)=\exp(-v^2/2\sigma^2)$$

where σ is calculated as the standard deviation for a discrete random variable.

In statistics and probability theory, standard deviation (represented by the symbol sigma, σ) shows how much variation or "dispersion" exists from the average (mean, or expected value). A low standard deviation indicates that the data points tend to be very close to the mean; high standard deviation indicates that the data points are spread out over a large range of values. The standard deviation of a random variable, statistical population, data set, or probability distribution is the square root of its variance. A useful property of standard deviation is that, unlike variance, it is expressed in the same units as the data. Note, however, that for measurements with percentage as unit, the standard deviation will have percentage points as unit.

The rank for resource i at time t is expressed as:

$$r_i(t)=w_i(t)*f(v_i(t))$$

The rank for all resource at time t is expressed as:

$$r(t)=\Sigma r_i(t)$$

where the value of r(t) has the same meaning as in linear case.

For the purpose of illustration, a history H can be defined as follows:

$$H=[t_1, t_2, \ldots t_n]$$

The corresponding time series values over the history H for a resource variable i can be defined as follows:

$$V_i(H)=[v_i(t_1), v_i(t_2), \ldots v_i(t_n)]$$

The corresponding ranking time series values for all N resource variables can be represented as follows:

$$R(H)=[r(t_1), r(t_2), \ldots r(t_n)]$$

where the linear and non-linear ranking equations can be used to evaluate rank:

$$r(t_i)=\Sigma r_j(t_i) \text{ where } j=1 \ldots N$$

For an inclusive subset of time series rank values that are within backup window $D_i=[T_{i0}, T_{i1}]$, compute standard mean value and variance:

$$\mu(D_i)=\Sigma r(t_j)/m$$

$$\sigma(D_i)^2=\Sigma(r(t_j)-\mu(D_i))^2/m$$

where j=1 ... m and $T_{i0}<t_j<T_{i1}$, and m is the number of rank samples within data movement window $D_i$.

The goal is to select a time window $D_i$ such that the standard mean value $\mu(D_i)$ is within a predefined value range such as between [0, 1], while the standard deviation $\sigma(D_i)$ is within an acceptable margin such as between [0, 1]. A set of $D_i$ calculations over a period of time can help scheduler automatically make informed decisions on time window selections, and adapt with changes.

Figure 5:
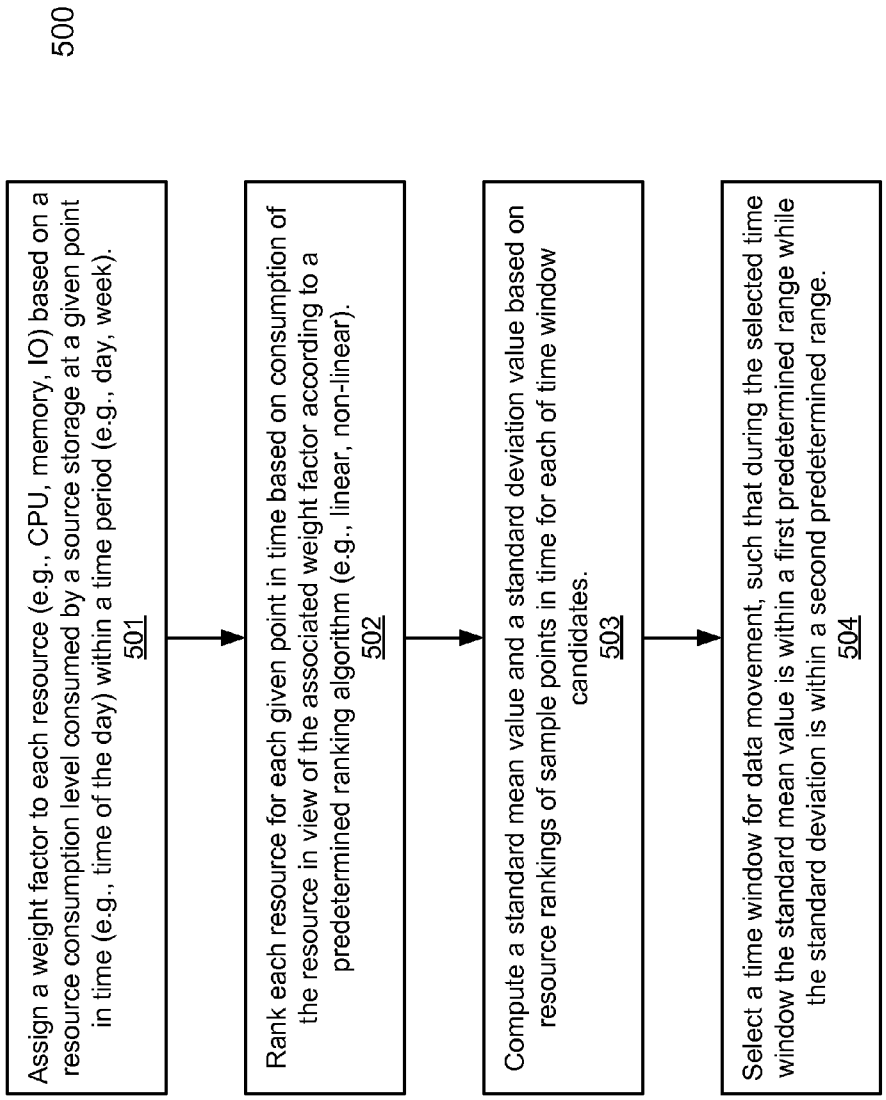
FIG. 5 is a flow diagram illustrating a method for determining an optimal time window for data movement according to one embodiment of the invention.

FIG. 5 is a flow diagram illustrating a method for determining an optimal data movement window according to one embodiment of the invention. Method 500 may be performed by analysis module 140 of FIG. 1, which may be implemented in software, hardware, or a combination thereof. Referring to FIG. 5, at block 501, processing logic assigns a weight factor to each resource (e.g., CPU, memory, IO, or network bandwidth) based on a resource consumption level consumed by a source storage at a given point in time (e.g., time of the day) within a time period (e.g., day, week). Weight factors may be the same or different at different points in time for the same resources. Weight factors may be the same or different for different resources at the same point in time. At block 502, processing logic ranks each resource for each given point in time based on consumption of the resource in view of the associated weight factor according to a predetermined ranking algorithm (e.g., linear, non-linear). At block 503, processing logic computes a standard mean value and a standard deviation value based on resource rankings of sample points in time for each of time window candidates. At block 504, processing logic selects one or more of the time window candidates for data movement, such that during the selected time window(s) the standard mean value is within a first predetermined range while the standard deviation is within a second predetermined range.

Figure 6:
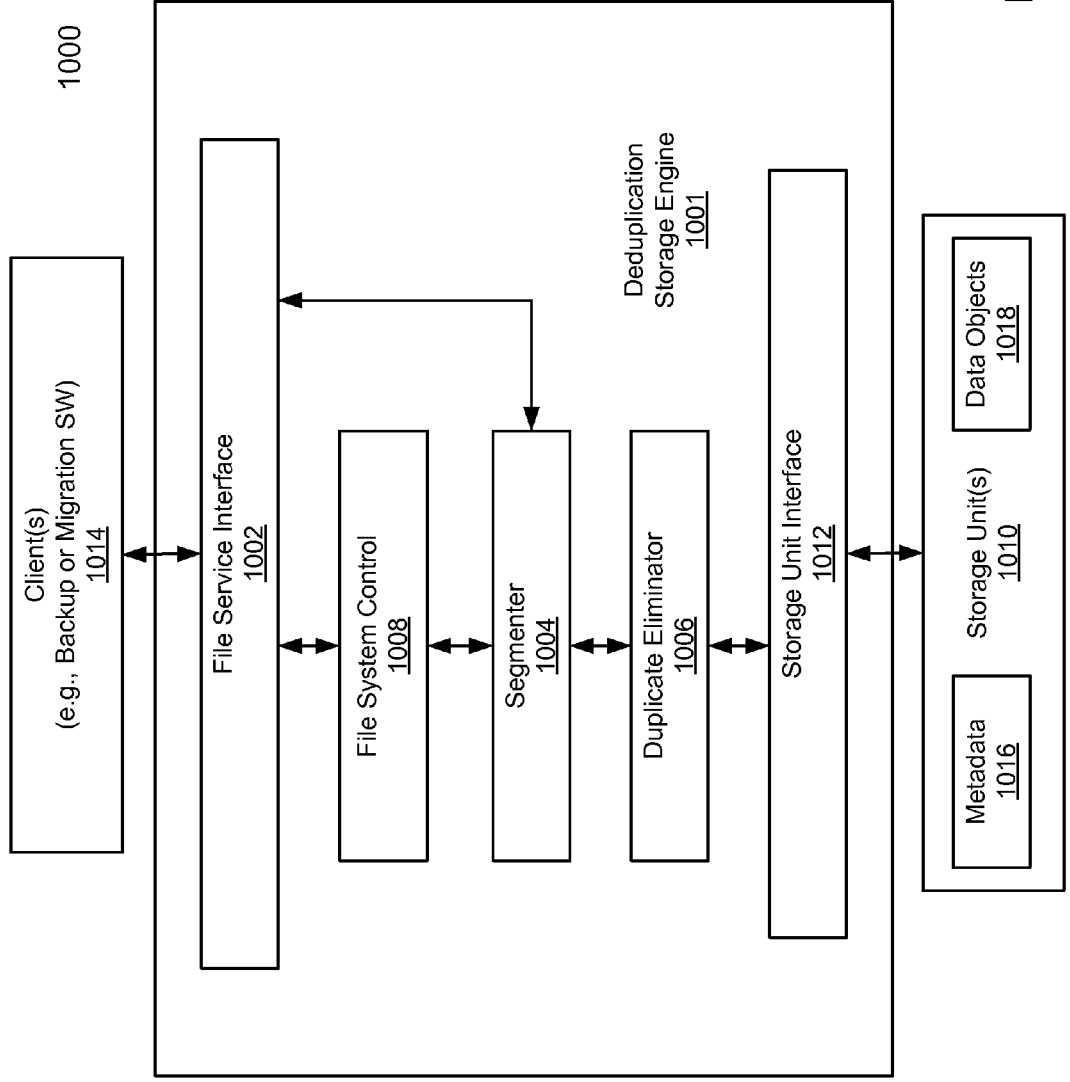
FIG. 6 is a block diagram illustrating a deduplicated storage system according to one embodiment of the invention.

FIG. 6 is a block diagram illustrating a deduplication storage system according to one embodiment of the invention. For example, deduplication storage system 1000 may be implemented as part of a deduplication storage system as described above, such as source or target storage system of FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients such as a client application or backup software located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 1010 may be organized into one or more volumes of Redundant Array of Inexpensive Disks (RAID). Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a CR of data chunks, or a container of one or more CRs. Fingerprints are mapped to a particular data object via metadata 1016, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace of a file system associated with the deduplication storage engine 1001. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008 processes information to indicate the chunk(s) association with a file. In some embodiments, a list of fingerprints is used to indicate chunk(s) associated with a file. File system control 1008 passes chunk association information (e.g., representative data such as a fingerprint) to an index (not shown). The index is used to locate stored chunks in storage units 1010 via storage unit interface 1012. Duplicate eliminator 1006 identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (not shown) into one or more storage containers stored in storage units 1010. The deduplicated chunks may be further compressed using a variation of compression algorithms, such as a Lempel-Ziv algorithm before being stored.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates with an index (not shown) to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software, hardware, or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for data movement over a network, the method comprising:
   receiving statistics data representing historic performance statistics over a predetermined period of time by a source storage system, the historic performance statistics including resource consumption of a plurality of resources including at least one of a processor, memory, input-output (IO) transactions, and network bandwidth;
   performing an analysis, by an analysis module executed by a processor, on the historic performance statistics to determine an optimal time window within the predetermined time period for data movement from the source storage system to a target storage system based on the analysis, wherein performing an analysis on the historic performance statistics comprises
      assigning a weight factor for each resource for each point in time over the predetermined time period during which the historic performance statistics were collected,
      ranking each resource based on its resource consumption in view of its corresponding weight factor for each point in time over the predetermined time period,
      calculating a standard mean value and a standard deviation value based on resource rankings of sample points in time for each of a plurality of time window candidates, and
      selecting a time window from the time window candidates for data movement, such that during the selected time window the standard mean value is within a first predetermined range while the standard deviation is within a second predetermined range; and scheduling, by a scheduler executed by the processor, the data movement from the source storage system to the target storage system according to the optimal time window.

2. The method of claim 1, wherein the historic performance statistics is periodically collected by a data collector running within the source storage system.

3. A computer-implemented method for data movement over a network, the method comprising:
receiving statistics data representing historic performance statistics over a predetermined period of time by a source storage system, the historic performance statistics including resource consumption of a plurality of resources including at least one of a processor, memory, input-output (IO) transactions, and network bandwidth;
performing an analysis, by an analysis module executed by a processor, on the historic performance statistics to determine an optimal time window within the predetermined time period for data movement from the source storage system to a target storage system based on the analysis, wherein performing an analysis on the historic performance statistics comprises
assigning a weight factor for each resource for each point in time over the predetermined time period during which the historic performance statistics were collected, and
ranking each resource based on its resource consumption in view of its corresponding weight factor for each point in time over the predetermined time period, wherein ranking $r_i(t)$ for resource i at time t is determined by $r_i(t)=w_i(t)*(M_i-v_i(t)/(M_i-N_i))$, wherein $w_i(t)$ is a weight factor for resource i at time t, wherein $v_i(t)$ is a consumption level of resource i at time t, wherein $M_i$ is a maximum value at time t and $N_i$ is a minimum value at time t; and
scheduling, by a scheduler executed by the processor, the data movement from the source storage system to the target storage system according to the optimal time window.

4. A computer-implemented method for data movement over a network, the method comprising:
receiving statistics data representing historic performance statistics over a predetermined period of time by a source storage system, the historic performance statistics including resource consumption of a plurality of resources including at least one of a processor, memory, input-output (IO) transactions, and network bandwidth;
performing an analysis, by an analysis module executed by a processor, on the historic performance statistics to determine an optimal time window within the predetermined time period for data movement from the source storage system to a target storage system based on the analysis, wherein performing an analysis on the historic performance statistics comprises
assigning a weight factor for each resource for each point in time over the predetermined time period during which the historic performance statistics were collected, and
ranking each resource based on its resource consumption in view of its corresponding weight factor for each point in time over the predetermined time period, wherein ranking $r_i(t)$ for resource i at time t is determined by $r_i(t)=w_i(t)*\exp(-v_i(t)^2/2\:\sigma^2)$, wherein $w_i(t)$ is a weight factor for resource i at time t, wherein $v_i(t)$ is a consumption level of resource i at time t, and wherein σ is calculated as a standard deviation for a discrete random variable; and
scheduling, by a scheduler executed by the processor, the data movement from the source storage system to the target storage system according to the optimal time window.

5. The method of claim 1, wherein the standard mean value $\mu(D_i)$ is determined by $\mu(D_i)=\Sigma r(t_j)/m$, wherein m represents a number of sample points in time within a time window candidate and $1\le j\le m$.

6. The method of claim 5, wherein the standard deviation $\sigma(D_i)^2$ is determined by $\sigma(D_i)^2=\Sigma(r(t_j)-\mu(D_i))^2/m$, wherein m represents a number of sample points in time within a time window candidate and $1\le j\le m$.

7. A non-transitory machine-readable medium having instructions stored therein, which when executed by a processor, cause the processor to perform a operations for data movement over a network, the operations comprising:
receiving statistics data representing historic performance statistics over a predetermined period of time by a source storage system, the historic performance statistics including resource consumption of a plurality of resources including at least one of a processor, memory, input-output (IO) transactions, and network bandwidth;
performing an analysis, by an analysis module executed by a processor, on the historic performance statistics to determine an optimal time window within the predetermined time period for data movement from the source storage system to a target storage system based on the analysis, wherein performing an analysis on the historic performance statistics comprises
assigning a weight factor for each resource for each point in time over the predetermined time period during which the historic performance statistics were collected,
ranking each resource based on its resource consumption in view of its corresponding weight factor for each point in time over the predetermined time period,
calculating a standard mean value and a standard deviation value based on resource rankings of sample points in time for each of a plurality of time window candidates, and
selecting a time window from the time window candidates for data movement, such that during the selected time window the standard mean value is within a first predetermined range while the standard deviation is within a second predetermined range; and
scheduling, by a scheduler executed by the processor, the data movement from the source storage system to the target storage system according to the optimal time window.

8. The medium of claim 7, wherein the historic performance statistics is periodically collected by a data collector running within the source storage system.

9. A non-transitory machine-readable medium having instructions stored therein, which when executed by a processor, cause the processor to perform operations for data movement over a network, the operations comprising:
receiving statistics data representing historic performance statistics over a predetermined period of time by a source storage system, the historic performance statistics including resource consumption of a plurality of resources including at least one of a processor, memory, input-output (IO) transactions, and network bandwidth;
performing an analysis, by an analysis module executed by a processor, on the historic performance statistics to determine an optimal time window within the predetermined time period for data movement from the source storage system to a target storage system based on the analysis, wherein performing an analysis on the historic performance statistics comprises
  assigning a weight factor for each resource for each point in time over the predetermined time period during which the historic performance statistics were collected, and
  ranking each resource based on its resource consumption in view of its corresponding weight factor for each point in time over the predetermined time period, wherein ranking $r_i(t)$ for resource i at time t is determined by $r_i(t)=w_i(t)*(M_i-v_i(t))/(M_i-N_i)$, wherein $w_i(t)$ is a weight factor for resource i at time t, wherein $v_i(t)$ is a consumption level of resource i at time t, wherein $M_i$ is a maximum value at time t and $N_i$ is a minimum value at time t; and
scheduling, by a scheduler executed by the processor, the data movement from the source storage system to the target storage system according to the optimal time window.

10. A non-transitory machine-readable medium having instructions stored therein, which when executed by a processor, cause the processor to perform operations for data movement over a network, the operations comprising:
receiving statistics data representing historic performance statistics over a predetermined period of time by a source storage system, the historic performance statistics including resource consumption of a plurality of resources including at least one of a processor, memory, input-output (IO) transactions, and network bandwidth;
performing an analysis, by an analysis module executed by a processor, on the historic performance statistics to determine an optimal time window within the predetermined time period for data movement from the source storage system to a target storage system based on the analysis, wherein performing an analysis on the historic performance statistics comprises
  assigning a weight factor for each resource for each point in time over the predetermined time period during which the historic performance statistics were collected, and
  ranking each resource based on its resource consumption in view of its corresponding weight factor for each point in time over the predetermined time period, wherein ranking $r_i(t)$ for resource i at time t is determined by $r_i(t)=w_i(t)*\exp(-v_i(t)^2/2\ \sigma^2)$, wherein $w_i(t)$ is a weight factor for resource i at time t, wherein $v_i(t)$ is a consumption level of resource i at time t, and wherein σ is calculated as a standard deviation for a discrete ransom variable; and
scheduling, by a scheduler executed by the processor, the data movement from the source storage system to the target storage system according to the optimal time window.

11. The medium of claim 7, wherein the standard mean value $\mu(D_i)$ is determined by $\mu(D_i)=\Sigma r(t_j)/m$, wherein m represents a number of sample points in time within a time window candidate and $1\leq j\leq m$.

12. The medium of claim 11, wherein the standard deviation $\sigma(D_i)^2$ is determined by $\sigma(D_i)^2=\Sigma(r(t_j)-\mu(D_i))^2/m$, wherein m represents a number of sample points in time within a time window candidate and $1\leq j\leq m$.

13. A data processing system, comprising:
a processor; and
a memory coupled to the processor for storing instructions, which when executed from the memory, cause the processor to
  receive statistics data representing historic performance statistics over a predetermined period of time by a source storage system, the historic performance statistics including resource consumption of a plurality of resources including at least one of a processor, memory, input-output (IO) transactions, and network bandwidth,
  perform an analysis on the historic performance statistics to determine an optimal time window within the predetermined time period for data movement from the source storage system to a target storage system based on the analysis, wherein performing an analysis on the historic performance statistics comprises
    assigning a weight factor for each resource for each point in time over the predetermined time period during which the historic performance statistics were collected,
    ranking each resource based on its resource consumption in view of its corresponding weight factor for each point in time over the predetermined time period,
    calculating a standard mean value and a standard deviation value based on resource rankings of sample points in time for each of a plurality of time window candidates, and
    selecting a time window from the time window candidates for data movement, such that during the selected time window the standard mean value is within a first predetermined range while the standard deviation is within a second predetermined range; and
  schedule the data movement from the source storage system to the target storage system according to the optimal time window.

14. The system of claim 13, wherein the historic performance statistics is periodically collected by a data collector running within the source storage system.

15. A data processing system comprising:
a processor; and
a memory coupled to the processor for storing instructions, which when executed from the memory, cause the processor to
  receive statistics data representing historic performance statistics over a predetermined period of time by a source storage system, the historic performance statistics including resource consumption of a plurality of resources including at least one of a processor, memory, input-output (IO) transactions, and network bandwidth,
  perform an analysis, by analysis module executed by a processor, on the historic performance statistics to determine an optimal time window within the predetermined time period for data movement from the source storage system to a target storage system based on the analysis, wherein performing an analysis on the historic performance statistics comprises
    assigning a weight factor for each resource for each point in time over the predetermined time period during which the historic performance statistics were collected,
    ranking each resource based on its resource consumption in view of its corresponding weight factor for each point in time over the predetermined time period, wherein ranking $r_i(t)$ for resource i at time t is determined by $r_i(t)=w_i(t)*(M_i-v_i(t))/(M_i-N_i)$, wherein $w_i(t)$ is a weight factor for resource i at time t, wherein $v_i(t)$ is a consumption level of resource i at time t, wherein $M_i$ is a maximum value at time t and $N_i$ is a minimum value at time t, and schedule the data movement from the source storage system to the target storage system according to the optimal time window.

16. A data processing system, comprising:

a processor; and a memory coupled to the processor for storing instructions, which when executed from the memory, cause the processor to receive statistics data representing historic performance statistics over a predetermined period of time by a source storage system, the historic performance statistics including resource consumption of a plurality of resources including at least one of a processor, memory, input-output (IO) transactions, and network bandwidth, perform an analysis, by analysis module executed by a processor, on the historic performance statistics to determine an optimal time window within the predetermined time period for data movement from the source storage system to a target storage system based on the analysis, wherein performing an analysis on the historic performance statistics comprises assigning a weight factor for each resource for each point in time over the predetermined time period during which the historic performance statistics were collected, ranking each resource based on its resource consumption in view of its corresponding weight factor for each point in time over the predetermined time period, wherein ranking $r_i(t)$ for resource i at time t is determined by $r_i(t)=w_i(t)*\exp(-v_i(t)^2/2\ \sigma^2)$, wherein $w_i(t)$ is a weight factor for resource i at time t, wherein $v_i(t)$ is a consumption level of resource i at time t, and wherein $\sigma$ is calculated as a standard deviation for a discrete random variable, and schedule the data movement from the source storage system to the target storage system according to the optimal time window.

17. The system of claim 13, wherein the standard mean value $\mu(D_i)$ is determined by $\mu(D_i)=\Sigma r(t_j)/m$, wherein m represents a number of sample points in time within a time window candidate and $1 \leq j \leq m$.

18. The system of claim 17, wherein the standard deviation $\sigma(D_i)^2$ is determined by $\sigma(D_i)^2=\Sigma(r(t_j)-\mu(D_i))^2/m$, wherein m represents a number of sample points in time within a time window candidate and $1 \leq j \leq m$.

* * * * *